(12) United States Patent
Santoso et al.

(10) Patent No.: US 12,404,426 B2
(45) Date of Patent: Sep. 2, 2025

(54) MASKING FILM WITH IMPROVED ADHESION STABILITY

(71) Applicant: TREDEGAR SURFACE PROTECTION, LLC, N. Chesterfield, VA (US)

(72) Inventors: Ricky Santoso, Glen Allen, VA (US); Kevin A. Brady, Cary, IL (US)

(73) Assignee: TREDEGAR SURFACE PROTECTION, LLC, N. Chesterfield, VA (US)

( * ) Notice: Subject to any disclaimer, the term of this patent is extended or adjusted under 35 U.S.C. 154(b) by 30 days.

(21) Appl. No.: 17/177,609

(22) Filed: Feb. 17, 2021

(65) Prior Publication Data

US 2021/0253911 A1 Aug. 19, 2021

Related U.S. Application Data

(60) Provisional application No. 62/978,602, filed on Feb. 19, 2020.

(51) Int. Cl.
*C09J 7/29* (2018.01)
*C08K 5/00* (2006.01)
(Continued)

(52) U.S. Cl.
CPC ............... *C09J 7/29* (2018.01); *C08K 5/005* (2013.01); *C08K 5/01* (2013.01); *C08L 23/06* (2013.01); *C09J 7/201* (2018.01); *C09J 7/241* (2018.01); *C09J 7/243* (2018.01); *C09J 7/245* (2018.01); *C09J 7/25* (2018.01); *C09J 7/401* (2018.01); *C09J 109/06* (2013.01); *C09J 123/06* (2013.01); *C09J 123/0815* (2013.01); *C09J 125/10* (2013.01); *C09J 153/025* (2013.01);
(Continued)

(58) Field of Classification Search
None
See application file for complete search history.

(56) References Cited

U.S. PATENT DOCUMENTS 5,687,517 A * 11/1997 Wiercinski .............. B32B 27/08
52/783.17
8,163,824 B2 * 4/2012 Okazaki ................. C09J 153/02
524/505

(Continued)

FOREIGN PATENT DOCUMENTS

CN 103459529 A 12/2013
CN 107207925 A 9/2017
(Continued)

OTHER PUBLICATIONS

JP 2007-253435 English Machine Translation.*
(Continued)

*Primary Examiner* — Frank D Ducheneaux
(74) *Attorney, Agent, or Firm* — KARCESKI IP LAW, PLLC (57) ABSTRACT

A masking film includes an adhesion layer that includes at least one hydrogenated styrene block copolymer and an adhesive surface having a surface roughness (Sa) of greater than about 2.0 μm. An Adhesion Build Value of the masking film is less than about 2.0 after the adhesion layer has been attached to a textured polycarbonate substrate and heated to 85° C. for 30 minutes.

20 Claims, 6 Drawing Sheets

(51) Int. Cl.
*C08K 5/01* (2006.01)
*C08L 23/06* (2006.01)
*C09J 7/20* (2018.01)
*C09J 7/24* (2018.01)
*C09J 7/25* (2018.01)
*C09J 7/40* (2018.01)
*C09J 109/06* (2006.01)
*C09J 123/06* (2006.01)
*C09J 123/08* (2006.01)
*C09J 125/10* (2006.01)
*C09J 153/02* (2006.01)

(52) U.S. Cl.
CPC ..... *C08L 2205/025* (2013.01); *C08L 2205/03* (2013.01); *C08L 2207/062* (2013.01); *C08L 2207/066* (2013.01); *C08L 2666/78* (2013.01); *C09J 2301/162* (2020.08); *C09J 2301/312* (2020.08); *C09J 2301/314* (2020.08); *C09J 2301/408* (2020.08); *C09J 2409/00* (2013.01); *C09J 2423/00* (2013.01); *C09J 2423/005* (2013.01); *C09J 2423/006* (2013.01); *C09J 2423/045* (2013.01); *C09J 2423/046* (2013.01); *C09J 2423/105* (2013.01); *C09J 2423/106* (2013.01); *C09J 2431/005* (2013.01); *C09J 2431/006* (2013.01); *C09J 2453/00* (2013.01); *C09J 2477/005* (2013.01); *C09J 2477/006* (2013.01)

(56) References Cited

U.S. PATENT DOCUMENTS

| 10,150,896 B2 | 12/2018 | Santoso et al. |
| 2004/0253464 A1 | 12/2004 | Krawinkel |
| 2004/0265540 A1 | 12/2004 | Balakoff et al. |
| 2008/0188580 A1 | 8/2008 | Sasagawa et al. |
| 2009/0186236 A1 | 7/2009 | Patel et al. |
| 2012/0052234 A1 | 3/2012 | Natarajan et al. |
| 2013/0149525 A1 | 6/2013 | Nagae et al. |
| 2016/0177151 A1* | 6/2016 | Santoso ............... C09J 123/08 428/352 |
| 2020/0190371 A1 | 6/2020 | Jones et al. |
| 2021/0009870 A1 | 1/2021 | Ssubramaniam et al. |

FOREIGN PATENT DOCUMENTS

| EP | 2554614 A1 * | 2/2013 | ........... B32B 27/304 |
| JP | 2007253435 A * | 10/2007 | |
| JP | 2010006927 A | 1/2010 | |
| JP | 2010221708 A | 10/2010 | |
| JP | 2017066395 A * | 4/2017 | |
| JP | 2019163347 A | 9/2019 | |
| JP | 2019167390 A | 10/2019 | |
| TW | 201141979 A | 12/2011 | |

OTHER PUBLICATIONS

Machine translation of JP 2007253435 A (Year: 2007).*
Machine translation of JP-2017066395-A (Year: 2017).*
International Search Report and Written Opinion dated Apr. 26, 2021, for International Patent Application No. PCT/US2021/018324.
International Preliminary Report on Patentability dated Sep. 1, 2022, for International Patent Application No. PCT/US2021/018324.
Taiwanese Office Action dated May 2, 2024, for Taiwanese Patent Application No. 110105496.
Extended European Search Report dated Feb. 15, 2024, for European Patent Application No. 21757667.7.
Japanese Office Action dated Oct. 29, 2024, for Japanese Patent Application No. 2022-549697.
Korean Office Action dated Mar. 18, 2025, for Korean Patent Application No. 10-2022-7031754.
Japanese Decision of Rejection dated Jul. 8, 2025, for Japanese Patent Application No. 2022-549697.

* cited by examiner

MASKING FILM WITH IMPROVED ADHESION STABILITY

CROSS-REFERENCE TO RELATED APPLICATIONS

This application claims the benefit of priority to U.S. Provisional Patent Application Ser. No. 62/978,602, filed Feb. 19, 2020, the entire content of which is incorporated herein by reference.

FIELD

The present invention generally relates to a masking film for protecting substrates that has improved adhesion stability at elevated temperatures.

BACKGROUND

Masking films, also known as surface protection films, are typically used to provide a physical barrier to prevent damage, contamination, scratching, scuffing, and/or other marring of a substrate to which they are adhered. Masking films may be applied to delicate, sensitive substrates that are used as components of electronic displays, and protect the substrates through one or more subsequent processing steps during manufacturing, as well as during shipping, and/or storage prior to use of the substrate.

Commonly used masking films achieve adhesion to substrates by, for example, van der Walls forces, which require the masking film and substrate to each have at least one very flat and uniform surface so the masking film can intimately contact the substrate.

As referred to herein, "adhesion" means adherence to a surface of the substrate to be protected through intimate contact via the natural blocking adhesion that exists between a very smooth surface and another smooth surface via polar bonding, ionic bonding and, in some instances, hydrogen bonding, and/or van der Waals secondary bonding. "Adhesive-less" adhesion is intended herein to encompass a releasable adhesion where the adhesion is reversible such that neither the film nor the substrate to which it is applied is modified or damaged. "Adhesion," as used herein, does not include the heat bonding or cross-linking functionality of adhesives as the adhesion force between the substrate surface and a film with pressure sensitive adhesives, or the heat bonding or cross-linking functionality of adhesives that is elevated to a point where the peel strength needed to remove such a film will exceed the tensile strength of such a film itself thus causing such a film to tear or break before it will peel away from the substrate.

The amount of adhesion can be increased or decreased by softening or hardening the composition of the masking film surface. Too much adhesion makes it difficult to remove the masking film from the substrate at the end of the process. Too little adhesion may result in the masking film separating prematurely from the substrate, so the substrate is no longer protected. If the surface of the substrate to be protected has a textured surface, increased adhesion may be needed to prevent the masking film from separating prematurely from the substrate.

A suitable masking or surface protection film for protecting surfaces, including textured surfaces, is disclosed in commonly owned U.S. Pat. No. 10,150,896. The adhesion layers of the surface protection films disclosed therein include blends of hydrogenated styrene block copolymer, high density polyethylene (HDPE), and low density polyethylene (LDPE). Table 3 of U.S. Pat. No. 10,150,896 lists adhesion test results for a series of films after the films had been laminated to a polycarbonate substrate and subjected to different temperatures. The data listed in Table 3 of U.S. Pat. No. 10,150,896 indicates that the adhesion of the surface protection film to the polycarbonate substrate increases after the laminate was subjected to elevated temperatures, thereby making removal of the surface protection film more difficult, which may be undesirable for some applications. The increase in adhesion may be represented by an "Adhesion Build Value," which is a ratio of the peel testing result at the elevated temperature to the peel testing result at room temperature.

It is desirable to have a masking film that provides the desired surface protection of a substrate, without damaging the surface of the substrate during use or during removal of the masking film when the masking film is no longer needed, even if the masking film and substrate are subjected to elevated temperatures. It is also desirable for the masking film to have a low Adhesion Build Value, thereby indicating that the adhesion properties of the masking film do not substantially increase at elevated temperatures.

SUMMARY

According to an aspect of the invention, there is provided a masking film for protecting a substrate. The masking film includes an adhesion layer that includes at least one hydrogenated styrene block copolymer and an adhesive surface having a surface roughness (Sa) of greater than about 2.0 μm. An Adhesion Build Value of the masking film is less than about 2.0 after the adhesion layer has been attached to a textured polycarbonate substrate and heated to 85° C. for 30 minutes.

In an embodiment, the adhesive surface has a void volume (Vv) of greater than about 3.0 $\mu m^3/\mu m^2$.

In an embodiment, the adhesive surface has a core void volume (Vvc) of greater than about 1.0 $\mu m^3/\mu m^2$.

In an embodiment, the masking film has an initial peel strength of greater than about 5 grams/inch at room temperature.

In an embodiment, the textured polycarbonate substrate has a surface roughness Sa of about 0.60 μm.

In an embodiment, the hydrogenated styrene block copolymer includes a tackifier.

In an embodiment, the hydrogenated styrene block copolymer is a styrene-butadiene-styrene (SEBS) block copolymer.

In an embodiment, the adhesion layer also includes low density polyethylene.

In an embodiment, the adhesion layer also includes a second hydrogenated styrene block copolymer. In an embodiment, the second hydrogenated styrene block copolymer is a styrene-butadiene-styrene (SEBS) block copolymer.

In an embodiment, the masking film also includes a release layer. In an embodiment, the release layer includes low density polyethylene.

In an embodiment, the masking film also includes a core layer in between the adhesion layer and the release layer. In an embodiment, the core layer includes a blend of high density polyethylene and low density polyethylene.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following figures are illustrated to emphasize the general principles of the present disclosure.

DETAILED DESCRIPTION

Figure 1:
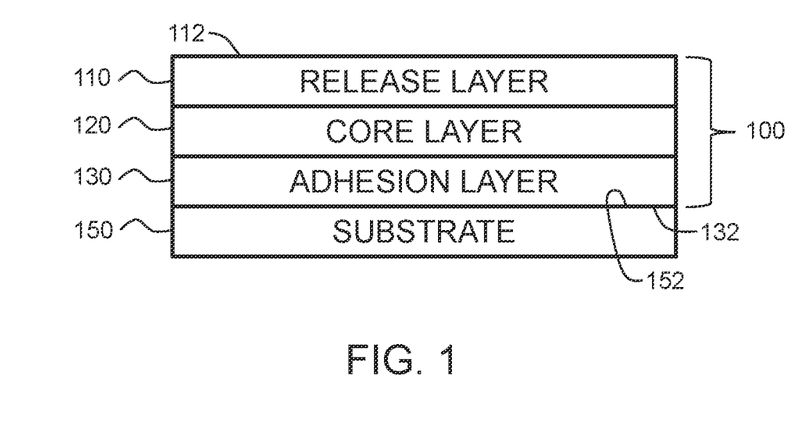
FIG. 1 schematically illustrates a masking film according to embodiments of the invention adhered to a substrate.

FIG. 1 schematically illustrates a masking film 100 according to embodiments of the invention. As illustrated, the masking film 100 is a multilayer film that includes a release layer 110 having an outer release surface 112, a core layer 120, and an adhesion layer 130 on an opposite side of the core layer 120 than the release layer 110. The adhesion layer 130 includes an outer adhesive surface 132. The outer adhesive surface 132 of the adhesion layer 130 is configured to contact a surface 152 of a substrate 150 to be protected by the masking film 100, such as an optical film for a display of an electronic device.

In an embodiment, the masking film 100 may have a thickness of between about 30 μm and about 70 μm. In an embodiment, the masking film 100 may have a thickness between about 40 μm and about 60 μm. In an embodiment, the masking film 100 may have a thickness of about 50 μm. In an embodiment, the thickness ratio of the three layers 110, 120, 130 may be about 15:65:20, i.e., 15% release layer 110, 65% core layer 120, and 20% adhesion layer 130.

As discussed herein, the roughness of a surface will be defined as either the arithmetic average height (Ra) of the micropeaks and microvalleys of the surface to the center line of such surface as measured by a profilometer in accordance with ANSI/ASME Test Method B46.1-1985, hereinafter referred to as "surface roughness (Ra)", or the arithmetical mean height of the surface as measured with a 3D optical profilometer, such as one manufactured by Zygo Corporation of Middlefield, CT, in accordance ISO 25178, hereinafter referred to as "surface roughness (Sa)". Both surface roughness (Ra) and surface roughness (Sa) are typically expressed with units of micrometers or microns (μm), or microinches ($10^{-6}$ inches).

Various volume parameters of a surface may also be measured with the 3D optical profilometer in accordance with ISO 25178, and is typically expressed with units of cubic micrometers per square micrometers of area ($\mu m^3/\mu m^2$). Typical filtering techniques may be used with software associated with the 3D optical profilometer to filter out high frequency readings ("noise") and/or low frequency readings ("waviness"). The software may also calculate the material ratio curve (also known as the Abbott-Firestone curve) by integrating the trace of the 3D optical profilometer, and from the material ratio curve, the void volume below a selected material ratio, which was 10% for the measurements reported herein as "void volume (Vv)", may be determined. The void volume at a material ratio of 80% is referred to herein as the "Dales void volume (Vvv)", and the difference between the void volume (Vv) at the material ratio of 10% and the Dales void volume (Vvv) at the material ratio of 80% is referred to herein as the "core void volume (Vvc)".

Release Layer

The release layer 110 may include one or more polyolefins, such as low density polyethylene (LDPE), linear low density polyethylene (LLDPE), high density polyethylene (HDPE), medium density polyethylene (MDPE), polypropylene (PP), random copolymer polypropylene, polypropylene impact copolymers, or metallocene linear low density polyethylene, plastomers, poly (ethylene-co-vinyl acetate), poly (ethylene-co-acrylic acid), poly (ethylene-comethyl acrylate), cyclic olefin polymers, polyamides, poly (ethylene-co-n-butyl acrylate), and mixtures thereof. In an embodiment, the release layer 110 may include a suitable polyolefin mixture of low density polyethylene (LDPE) and high density polyethylene (HDPE) in a ratio of 60:40 to 40:60 by weight. In an embodiment, the release layer 110 may include LDPE, but not include HDPE. In an embodiment, one or more additives, such as an antioxidant, may be included in the release layer 110.

The thickness of the release layer 110 may be between about 1 μm and about 20 μm, such as between about 5 μm and about 12 μm, such as about 1 μm, about 2 μm, about 3 μm, about 4 μm, about 5 μm, about 6 μm, about 7 μm, about 8 μm, about 9 μm, about 10 μm, about 11 μm, or about 12 μm.

Core Layer

The core layer 120 may include one or more polyolefins, such as low density polyethylene (LDPE), linear low density polyethylene (LLDPE), high density polyethylene (HDPE), medium density polyethylene, polypropylene (PP), random copolymer polypropylene, polypropylene impact copolymers, metallocene linear low density polyethylene, plastomers, poly(ethylene-co-vinyl acetate), poly(ethylene-co-acrylic acid), poly(ethylene-co-methyl acrylate), cyclic olefin polymers, polyamides, poly(ethyleneco-n-butyl acrylate), and mixtures thereof. One suitable polyolefin mixture includes low density polyethylene (LDPE) and high density polyethylene (HDPE) in a ratio in a range of 60:40 to 40:60 by weight. The core layer 120 may include one or more additives, such as an antioxidant.

The thickness of the core layer 120 of the masking film 100 in accordance with embodiments of the invention may be between about 10 μm and about 50 μm, such as between about 20 μm and about 40 μm, such as about 20 μm, about 21 μm, about 22 μm, about 23 μm, about 24 μm, about 25

μm, about 26 μm, about 27 μm, about 28 μm, about 29 μm, about 30 μm, about 31 μm, about 32 μm, about 33 μm, about 34 μm, about 35 μm, about 36 μm, about 37 μm, about 38 μm, about 39 μm or about 40 μm.

Adhesion Layer

The adhesion layer 130 according to embodiments of the masking film 100 includes a blend of one or more hydrogenated styrene block copolymers, and optionally one or more polyolefins, such as a low density polyethylene (LDPE) and/or a high density polyethylene (HDPE). Suitable hydrogenated styrene block copolymers have a polystyrene block-polydiene block polymer structure prior to hydrogenation. The hydrogenated block copolymer, before hydrogenation, can be linear or radial. Suitable polydienes for the hydrogenated styrene block copolymer include polybutadiene (1,3-butadiene), polyisoprene and mixtures thereof. Hydrogenation of the polystyrene block-polydiene block structure may result in a styrene-ethylene-butylene-styrene polymeric structure, otherwise referred to as "SEBS", or a styrene-ethylene-propylene-styrene, otherwise referred to as "SEPS", for example. In embodiments of the invention, the styrene content of the hydrogenated styrene block copolymer may be between 10 wt % and 70 wt %.

The Melt Flow Rates ("MFR") of thermoplastics, such as styrene block copolymers, are inversely correlated to viscosities of the thermoplastics. A high MFR means that the thermoplastic has a low viscosity and vice-versa. As used herein, unless otherwise stated, "MFR" shall mean the Melt Flow Rate as determined according to ASTM D-1238, at 230° C. under a 2.16 kg mass and measured in grams per 10 minutes. Suitable hydrogenated styrene block copolymers for the adhesion layer 130 may be between about 0.1 g/10 min. and about 100 g/10 min.

In various embodiments of the invention, the adhesion layer 130 may comprise 50% to 100%, by weight, hydrogenated styrene block copolymer. In such embodiments, the adhesion layer 130 may also comprise 0% to 50%, by weight, of LDPE and/or HDPE.

The thickness of the adhesion layer 130 of the masking film 100 in accordance with embodiments of the present invention may be between about 1 μm and about 20 μm, such as between about 3 μm and about 15 μm, such as about 3 μm, about 4 μm, about 5 μm, about 6 μm, about 7 μm, about 8 μm, about 9 μm, about 10 μm, about 11 μm, about 12 μm, about 13 μm, about 14 μm, or about 15 μm.

Substrates

While the masking film 100 of the present invention may be applied to any substrate 150, typical substrates include, by way of illustration only, polycarbonate, acrylic, polyvinylchloride, polyethylene terephthalate (PET), glycol modified polyethylene terephthalate (PETG), polyimide, glass, ceramic and metal. Such substrates typically have an average surface roughness (Ra) in the range of between about 0 microinches (0 μm) and about 150 microinches (3.81 μm). Substrates 150 may have a smooth surface 152 (i.e. a surface having an average surface roughness (Ra) in the range of about 0 microinches (0 μm) to about 5 microinches (0.127 μm), or a textured surface 152 having an average surface roughness (Ra) in the range of about 5 microinches (0.127 μm) to about 150 microinches (3.81 μm).

Application of Masking Film to Substrates

Any of a variety of conventional methods can be utilized for applying the multilayer masking film 100 to the substrate 150 and for pressing the applied masking film 100 against the surface 152 of the substrate 150. Generally speaking, the masking film 100 may be taken off from a roll and directly applied to the substrate 150 by means of a nip roll or similar system through which the masking film 100 and the substrate 150 are passed. As the masking film 100 is pulled off the roll, the spiral orientation of the masking film 100 on the roll has the outer adhesive surface 132 of the adhesion layer 130 disengaging from the outer surface 112 of the release layer 110, without damaging either layer or the masking film 100 as a whole.

EXAMPLES

A series of three-layer masking films 100 were extruded on a co-extrusion cast film line using the same conditions. The target total thickness of each film 100 was about 50 μm, with 15% of the total thickness attributable to the release layer 110, about 65% of the total thickness attributable to the core layer 120, and about 20% of the total thickness attributable to the adhesion layer 130. The release layer 110 for each film 100 consisted essentially of LDPE. The core layer 120 for each film 100 was a blend of about 60 wt % HDPE and about 40 wt % LDPE. For the adhesion layer 130, different hydrogenated styrene block copolymers were used. Specifically, Kraton™ MD 6951, a styrene-butadiene-styrene (SEBS) type hydrogenated styrene block copolymer that is manufactured by Kraton Performance Polymers, Inc., and Versaflex™ PF MD6666N, a styrene-butadiene-styrene (SEBS) type hydrogenated styrene block copolymer that is manufactured by PolyOne Corporation, were used in the adhesion layer 130. Versaflex™ PF MD6666N also includes a tackifier.

Two blends were investigated for use as the adhesion layer 130. "Blend A" was a blend of 55 wt. % Versaflex™ PF MD6666N, 20 wt. % Kraton™ MD6951, and 25 wt. % LDPE. "Blend B" was a blend of 75 wt. % Versaflex™ PF MD6666N and 25 wt. % Kraton™ MD6951. For the Comparative Example, a blend of 55 wt. % Versaflex™ PF MD6666N, 20 wt. % Kraton™ MD6951, 15 wt. % LDPE, and 10 wt. % HDPE ("Blend C") was used for the adhesion layer.

The surface roughness (Ra) of the cast roll during manufacturing of the masking film 100, and the resulting surface characteristics of the adhesive surface 132 of the masking film 100 were also investigated. Specifically, cast rolls having surface roughness (Ra) values of 24 microinches (0.61 μm), 100 microinches (2.54 μm), 207 microinches (5.26 μm), and 600 microinches (15.24 μm) were used to create samples. A relatively smooth cast roll having a surface roughness (Ra) of 0.5 microinches (0.0127 μm) was used for the Comparative Example. A summary of the blends and surface roughness (Ra) of the cast rolls that were used to create nine different samples, including the Comparative Example, is provided in Table I below.

TABLE I

SUMMARY OF EXAMPLES

| Sample | Adhesion Layer Blend | Surface Roughness (Ra) of Cast Roll (μm) |
|---|---|---|
| Example 1 | A | 0.61 |
| Example 2 | B | 0.61 |
| Example 3 | B | 2.54 |
| Example 4 | A | 2.54 |
| Example 5 | B | 5.26 |

TABLE I-continued

SUMMARY OF EXAMPLES

| Sample | Adhesion Layer Blend | Surface Roughness (Ra) of Cast Roll (μm) |
|---|---|---|
| Example 6 | A | 5.26 |
| Example 7 | A | 15.24 |
| Example 8 | B | 15.24 |
| Comparative Example | C | 0.0127 |

Each of the film samples listed in Table I was tested for surface roughness (Sa), void volume (Vv) and Dales void volume (Vvv) using the testing methodology described above, and core void volume (Vvc) was calculated by subtracting the Dales void volume (Vvv) from the void volume (Vv). Table II below lists the surface characteristics of the adhesive surface for each film samples, including surface roughness (Sa), void volume (Vv), Dales void volume (Vvv) and core void volume (Vvc).

TABLE II

SURFACE CHARACTERISTICS OF FILM ADHESIVE SURFACE

| Sample | Surface Roughness (Sa) (μm) | Void Volume (Vv) (μm³/μm²) | Dales Void Volume (Vvv) (μm³/μm²) | Core Void Volume (Vvc) (μm³/μm²) |
|---|---|---|---|---|
| Example 1 | 0.43 | 0.48 | 0.08 | 0.40 |
| Example 2 | 0.57 | 0.96 | 0.07 | 0.89 |
| Example 3 | 2.12 | 3.63 | 1.74 | 1.89 |
| Example 4 | 2.31 | 3.94 | 0.57 | 3.37 |
| Example 5 | 3.97 | 7.27 | 0.89 | 6.38 |
| Example 6 | 4.26 | 7.48 | 0.81 | 6.67 |
| Example 7 | 8.43 | 17.58 | 1.88 | 15.70 |
| Example 8 | 9.20 | 20.14 | 2.28 | 17.87 |
| Comparative Example | 0.35 | 0.37 | 0.12 | 0.25 |

Each of the films was aged under ambient conditions (e.g., about 23° C.) for two weeks and then laminated onto a polycarbonate substrate 150 having a textured surface 152 having a surface roughness (Sa) of about 23.6 microinches (0.60 μm), with the adhesive surface 132 of the adhesion layer 130 contacting the textured surface 152 of the polycarbonate substrate 150. Laminate specimens were cut to a width of 1 inch and allowed to sit at room temperature (e.g., about 23° C.) for one hour, or in an oven at 85° C. for 30 minutes. A TA.XTPlus Texture Analyzer manufactured by Texture Technologies Corp. was used to measure 180° peel force, in grams/inch, at a rate of 5 mm/second ("Peel Force Value").

An Adhesion Build Value for each sample was calculated by dividing the Peel Force Value after the sample has been exposed to 85° C. for 30 minutes by the Peel Force Value at room temperature. Table III below lists the results of the peel force testing, including the calculated Adhesion Build Values. It is desirable for the Adhesion Build Value to be less than or equal to about 2.0. It is also desirable for the peel force to be less than about 50 grams/inch.

TABLE III

SUMMARY OF PEEL FORCE VALUES - TEXTURED PC

| Sample | PEEL FORCE VALUE @ 23° C. (grams/inch) | PEEL FORCE VALUE @ 85° C. (grams/inch) | Adhesion Build Value |
|---|---|---|---|
| Example 1 | 23.9 | 161.8 | 6.8 |
| Example 2 | 58.5 | 416.4 | 7.1 |
| Example 3 | 48.0 | 101.9 | 2.1 |
| Example 4 | 12.2 | 11.3 | 0.9 |
| Example 5 | 33.4 | 36.0 | 1.1 |
| Example 6 | 7.1 | 8.6 | 1.2 |
| Example 7 | 5.6 | 9.3 | 1.7 |
| Example 8 | 11.8 | 20.1 | 1.7 |
| Comparative Example | 11.8 | 223.4 | 18.9 |

Figure 2:
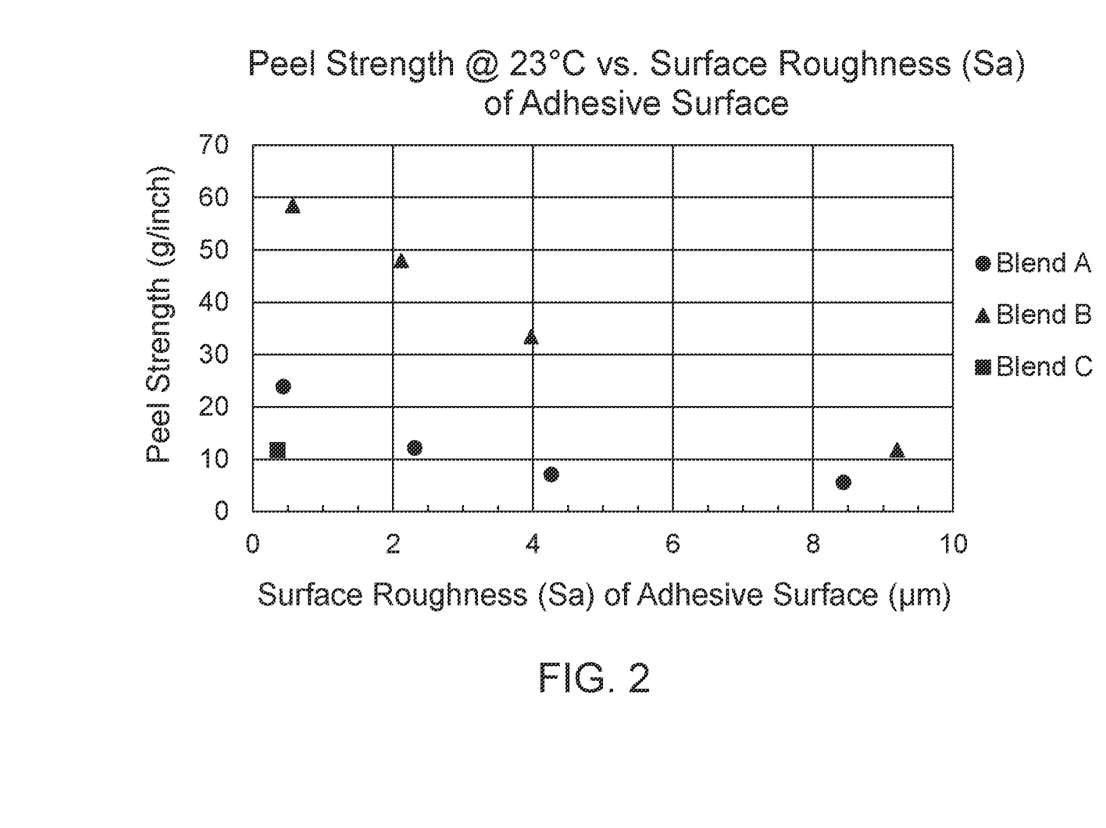
FIG. 2 is a graph illustrating peel strength test results at room temperature as a function of surface roughness (Sa) of an adhesive surface of the masking film of FIG. 1 after being adhered to a polycarbonate substrate having a textured surface.

FIG. 2 illustrates the Peel Force Values at room temperature for the samples as a function of surface roughness (Sa) of the adhesive surface 132 of each masking film 100, as well as the blend used for the adhesion layer 130. As expected, Blend B, which had the higher content of Versaflex™ PF MD6666N, and therefore tackifier, provided masking films with adhesive layers that exhibited greater peel strengths than masking films with adhesive layers that included Blend A or Blend C. In addition, increasing the surface roughness (Sa) of the adhesive surface decreased the peel strength of corresponding masking film.

Figure 3:
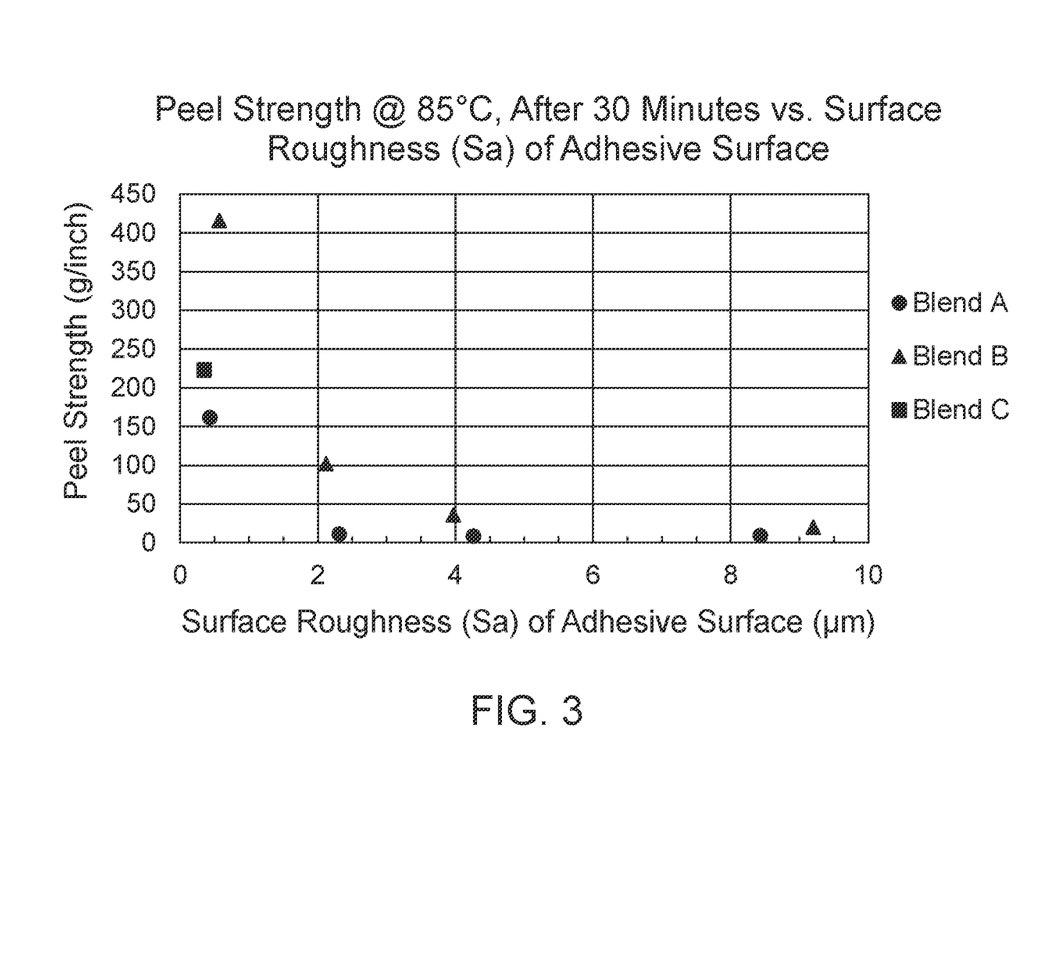
FIG. 3 is a graph illustrating peel strength test results at 85° C. after 30 minutes as a function of surface roughness (Sa) of the adhesive surface of the masking film of FIG. 1 after being adhered to the polycarbonate substrate having a textured surface.

FIG. 3 illustrates the Peel Force Values for the samples, after the samples had been exposed to 85° C. for 30 minutes, as a function of surface roughness (Sa) of the adhesive surface 132 of each masking film 100, as well as the blend used for the adhesion layer 130. As illustrated, the peel strengths of the masking films that had adhesive surfaces with relatively low surface roughnesses (Sa), i.e. less than 1.0 μm were much greater than the peel strengths of the masking films that had adhesive surfaces with surface roughnesses (Sa) greater than about 2.0 μm.

Figure 4:
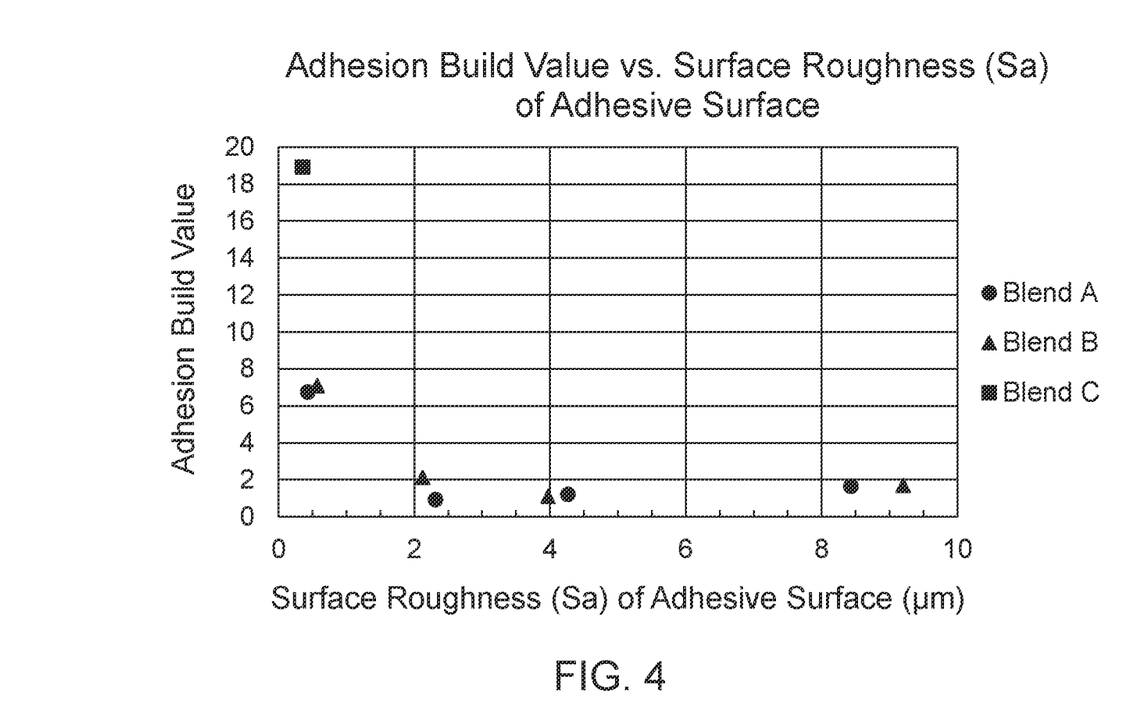
FIG. 4 is a graph illustrating an Adhesion Build Value as a function of surface roughness (Sa) of the adhesive surface of the masking film of FIG. 1 after being adhered to the polycarbonate substrate having a textured surface.

FIG. 4 illustrates the Adhesion Build Values for the samples as a function of surface roughness (Sa) of the adhesive surface 132 of each masking film 100 as well as blend used for the adhesion layer 130. As noted above, it is desirable for the masking film to have an Adhesion Build Value of less than about 2.0. Each of the masking films with an adhesive surface having a surface roughness (Sa) of greater than about 2.0 μm had an Adhesion Build Value of less than about 2.0, regardless of blend.

Figure 5:
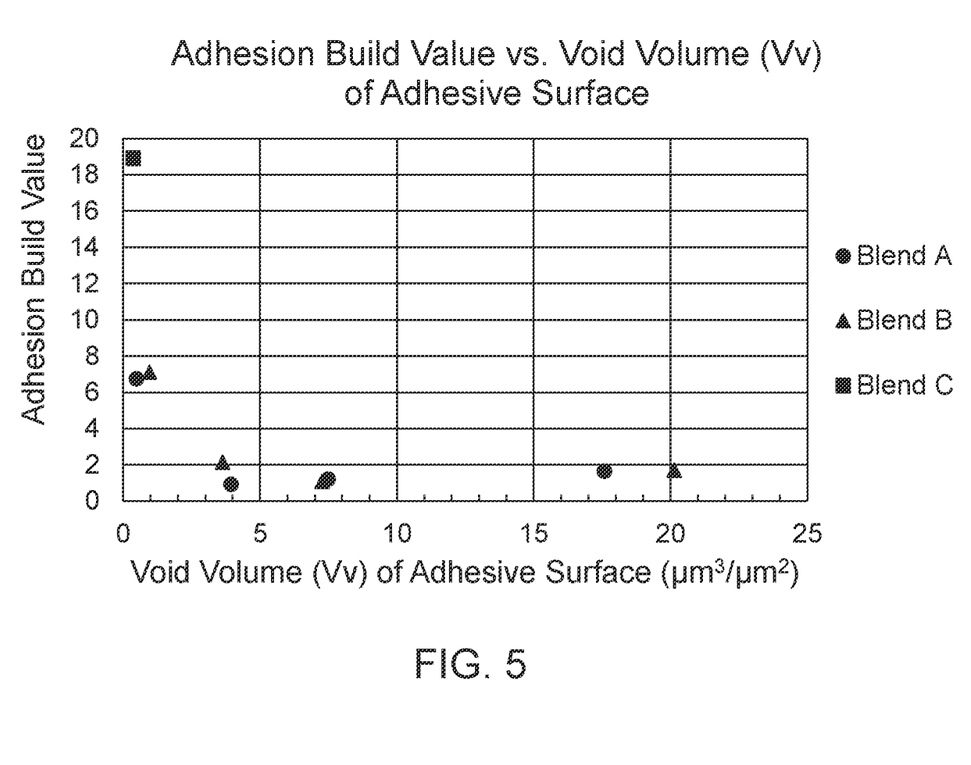
FIG. 5 is a graph illustrating an Adhesion Build Value as a function of void volume (Vv) of the adhesive surface of the masking film of FIG. 1 after being adhered to the polycarbonate substrate having a textured surface.

FIG. 5 illustrates the Adhesion Build Values for the samples as a function of void volume (Vv) of the adhesive surface 132 of each masking film 100, as well as blend used for the adhesion layer 130. As illustrated, each of the masking films with an adhesive surface having a void volume (Vv) of greater than 3.0 μm³/μm² had an Adhesion Build Value of less than about 2.0, regardless of blend.

Figure 6:
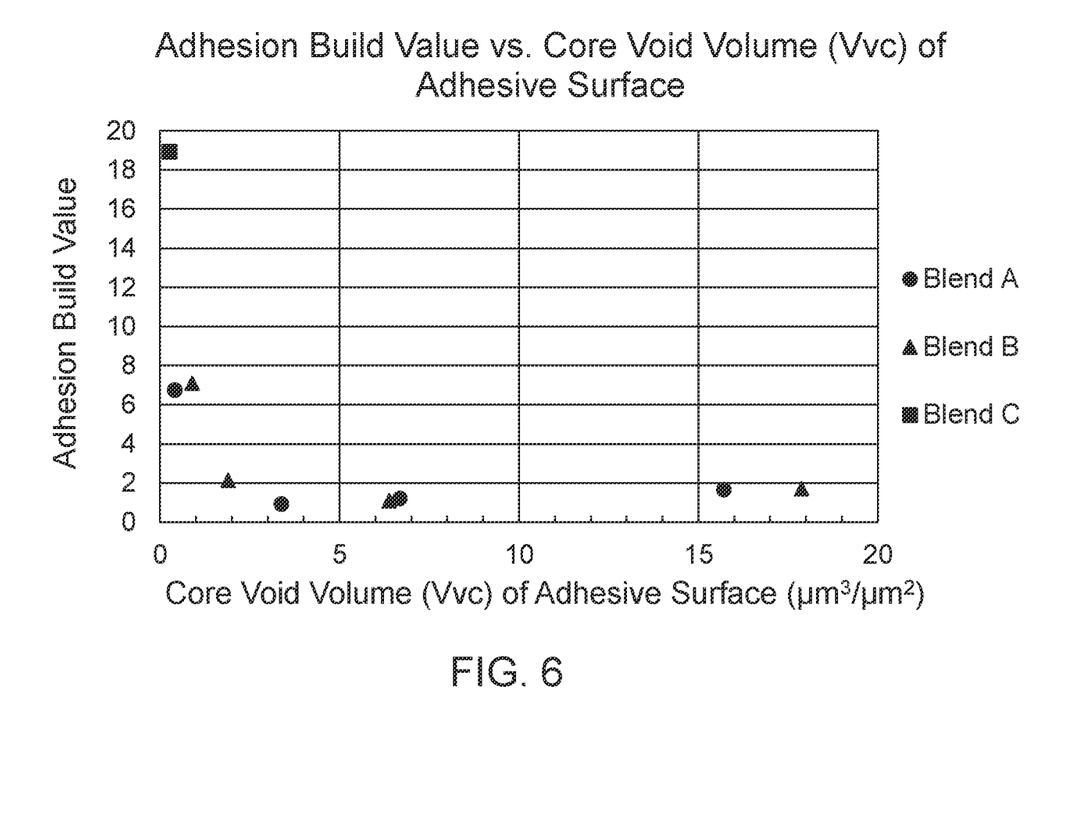
FIG. 6 is a graph illustrating an Adhesion Build Value as a function of core void volume (Vvc) of the adhesive surface of the masking film of FIG. 1 after being adhered to the polycarbonate substrate having a textured surface.

FIG. 6 illustrates the Adhesion Build Values for the samples as a function of core void volume (Vvc) of the adhesive surface 132 of each masking film 100, as well as blend used for the adhesion layer 130. As illustrated, each of the masking films with an adhesive surface having a core void volume (Vvc) of greater than about 1.0 μm³/μm² had an Adhesion Build Value of less than about 2.0, regardless of blend.

The test results described above indicate that the blends for the adhesion layer 130, as well as the surface roughness (Sa) and/or void volume (Vv) and core void volume (Vvc) of the adhesive surface 132 may be adjusted to achieve the desirable initial peel strength and Adhesion Build Value.

The embodiments described herein represent a number of possible implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

What is claimed is:

1. A masking film for protecting a substrate, the masking film comprising:
   a release layer comprising at least one polyolefin, low density polyethylene, linear low density polyethylene, high density polyethylene, medium density polyethylene, polypropylene, random copolymer polypropylene, polypropylene impact copolymers, metallocene linear low density polyethylene, plastomers, poly(ethylene-co-vinyl acetate), poly(ethylene-co-acrylic acid), poly(ethylene-co-methyl acrylate), cyclic olefin polymers, polyamides, poly(ethylene-co-n-butyl acrylate), and mixtures thereof;
   a core layer comprising at least one polyolefin, low density polyethylene, linear low density polyethylene, high density polyethylene, medium density polyethylene, polypropylene, random copolymer polypropylene, polypropylene impact copolymers, metallocene linear low density polyethylene, plastomers, poly(ethylene-co-vinyl acetate), poly(ethylene-co-acrylic acid), poly(ethylene-co-methyl acrylate), cyclic olefin polymers, polyamides, poly(ethylene-co-n-butyl acrylate), and mixtures thereof; and
   an adhesion layer comprising 50% to 100% by weight of at least one hydrogenated styrene block copolymer;
   wherein the core layer is between the release layer and the adhesion layer;
   wherein the release layer has a release layer thickness between about 1 μm and about 20 μm;
   wherein the core layer has a core layer thickness between about 10 μm and about 50 μm;
   wherein the adhesion layer has an adhesion layer thickness between about 1 μm and about 20 μm;
   wherein the adhesion layer comprises an adhesive surface having a surface roughness (Sa) of greater than about 2.0 μm; and
   wherein an Adhesion Build Value of the masking film is less than about 2.0 after the adhesion layer has been attached to a textured polycarbonate substrate and heated to 85° C. for 30 minutes and a peel force is less than about 50 grams/inch (19.69 g/cm).

2. The masking film according to claim 1, wherein the adhesive surface has a void volume (Vv) of greater than about 3.0 $μm^3/m^2$.

3. The masking film according to claim 1, wherein the adhesive surface has a core void volume (Vvc) of greater than about 1.0 $μm^3/m^2$.

4. The masking film according to claim 1, wherein the masking film has an initial peel strength of greater than about 5 grams/inch (1.97 g/cm) at room temperature.

5. The masking film according to claim 1, wherein the textured polycarbonate substrate has a surface roughness Sa of about 0.60 μm.

6. The masking film according to claim 1, wherein the hydrogenated styrene block copolymer comprises a tackifier.

7. The masking film according to claim 1, wherein the hydrogenated styrene block copolymer is a styrene-butadiene-styrene (SEBS) block copolymer.

8. The masking film according to claim 1, wherein the adhesion layer further comprises low density polyethylene.

9. The masking film according to claim 1, wherein the adhesion layer further comprises a second hydrogenated styrene block copolymer.

10. The masking film according to claim 9, wherein the second hydrogenated styrene block copolymer is a styrene-butadiene-styrene (SEBS) block copolymer.

11. The masking film according to claim 1, wherein the release layer comprises low density polyethylene.

12. The masking film according to claim 1, wherein the core layer comprises a blend of high density polyethylene and low density polyethylene.

13. The masking film according to claim 1, wherein the release layer comprises low density polyethylene and high density polyethylene in a ratio of between 60:40 to 40:60 by weight.

14. The masking film according to claim 13, wherein the release layer further comprises an antioxidant.

15. The masking film according to claim 1, wherein the core layer comprises low density polyethylene and high density polyethylene in a ratio of between 60:40 to 40:60 by weight.

16. The masking film according to claim 15, wherein the core layer further comprises an antioxidant.

17. The masking film according to claim 1, wherein a styrene content of the hydrogenated styrene block copolymer is between 10 wt % and 70 wt %.

18. The masking film according to claim 1, wherein the at least one hydrogenated styrene block copolymer has a melt flow rate between about 0.1 g/10 min. and about 100 g/10 min.

19. The masking film according to claim 1, wherein the masking film has a thickness between about 30 μm and about 70 μm.

20. The masking film according to claim 1, wherein the adhesion layer further comprises 0 wt % to 50 wt % of at least one of low density polyethylene and high density polyethylene.

* * * * *